United States Patent [19]

Laster et al.

[11] Patent Number: 4,860,265

[45] Date of Patent: Aug. 22, 1989

[54] SEISMIC TRACE RESTORATION USING F-K FILTERING

[75] Inventors: Stanley J. Laster, Dallas; Robert A. Meek, Sanger; Thomas E. Shirley, Richardson, all of Tex.

[73] Assignee: Mobil Oil Corporation, New York, N.Y.

[21] Appl. No.: 148,307

[22] Filed: Jan. 25, 1988

[51] Int. Cl.$^4$ .......................... G01V 1/28; G01V 1/36
[52] U.S. Cl. ....................................... 367/73; 367/43; 364/431
[58] Field of Search ...................... 367/21, 43, 47, 49, 367/38, 73; 364/421, 417, 418, 576, 578; 324/331; 382/54

[56] References Cited

U.S. PATENT DOCUMENTS

| | | | |
|---|---|---|---|
| 4,063,549 | 12/1977 | Beretsky et al. | 367/87 |
| 4,114,189 | 9/1978 | Davis | 364/718 |
| 4,204,279 | 5/1980 | Parrech et al. | 364/421 |
| 4,218,765 | 8/1980 | Kinkade | 367/45 |
| 4,380,059 | 4/1983 | Ruehle | 367/46 |
| 4,530,076 | 7/1985 | Dwyer | 367/135 |
| 4,570,122 | 2/1986 | Leu | 324/331 |
| 4,594,693 | 6/1986 | Pann | 367/43 |
| 4,732,158 | 3/1988 | Sedeh | 364/417 |

OTHER PUBLICATIONS

Claerbout, J. F., "Restoration of Missing Data by Least Squares Optimization"; Stanford Exploration Project, Report No. 25, pp. 1–16, Oct. 1980.
Gerchberg, R. W., "Super-Resolution Through Error Energy Reduction"; Optica Acta, vol. 21, No. 9, pp. 709–720, 1974.
Papoulis, A., "A New Algorithm in Spectral Analysis and Band–Limited Extrapolation"; IEEE Transaction on Circuits and Systems, vol. CAS-22, No. 9, pp. 735–742, Sep. 1975.
Papoulis, A., Signal Analysis, Chapter 7, McGraw–Hill, Inc., 1977, pp. 221–261.
Schafer, R. W., Mersereau, R. M., and Richards, M. A.; "Constrained Iterative Restoration Algorithms"; Proceedings of the IEEE, vol. 69, pp. 432–450, 1981.
White, R. B.; "Signal and Noise Estimation . . . Methods"; Proc. IEEE; vol. 72, No. 10, pp. 1340–1356, 10/84, abst. only.
Zhu et al; "A Supplement to . . . (Fast Fourier Transform)"; Oil Geophys. Prosp., vol. 4, pp. 75–78, 1981; abst. only.
Cohn et al; "Three-Dimensional . . . Arbitrary Reference"; Geophysics, vol. 51, #8, pp. 1552–1558, 8/86; abst. only.
Benaleil et al; Frequency Wavenumber . . . Data Processing; 47th Europ. Ass. Explor. Geophys. Mtg., Budapest, Hung. 6/85; abst.

Primary Examiner—Nelson Moskowitz
Attorney, Agent, or Firm—Alexander J. McKillop; Charles J. Speciale; George W. Hager, Jr.

[57] ABSTRACT

Method of restoring null traces in seismic records. The seismic record is transformed from the x-t domain to the f-k domain by a series of fast Fourier transforms. The f-k transform of the seismic record is filtered to retain only coherent events and the filtered f-k transform is inverse-transformed back to the x-t domain. A first determination of the restored trace corresponding to the null trace is selected and substituted for the null trace. The first determination of the restored trace is used to determine a fully restored trace.

22 Claims, 5 Drawing Sheets

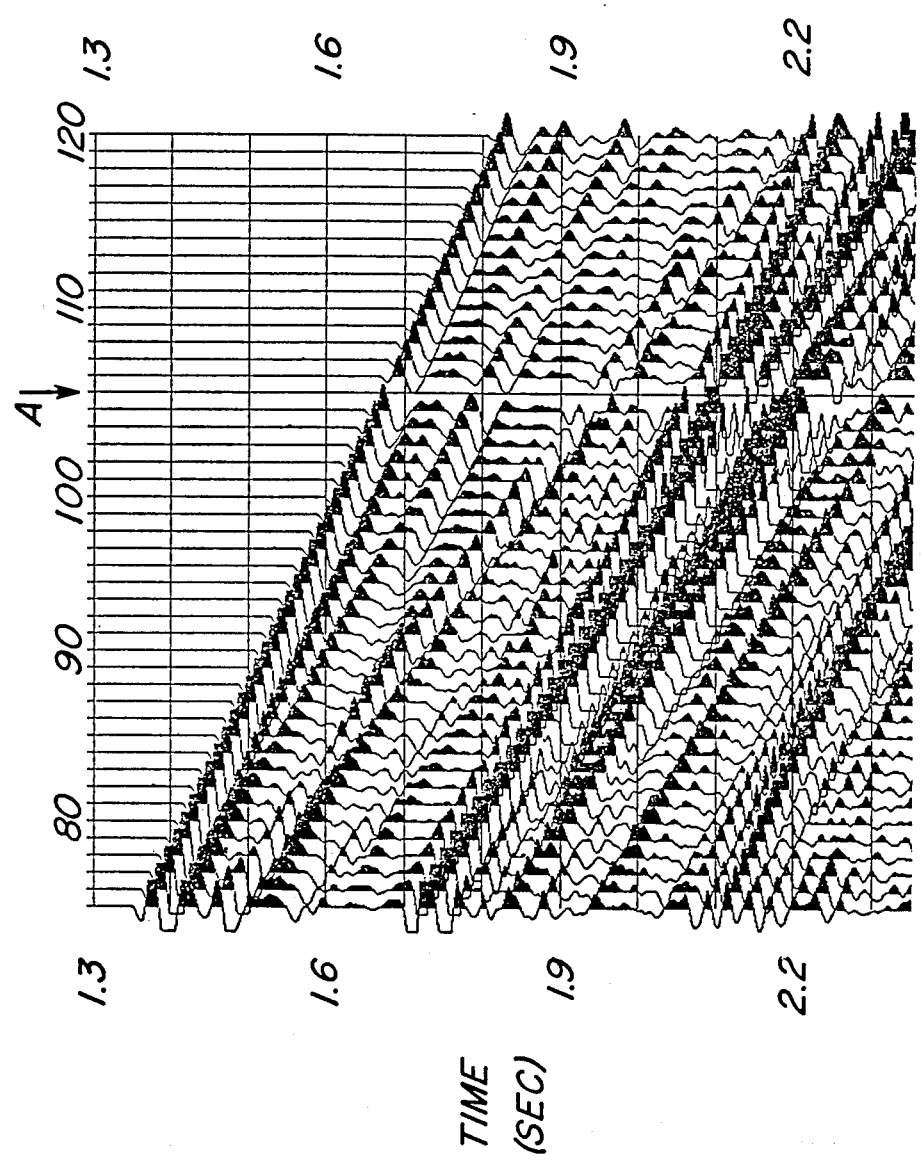

SEISMIC TRACE RESTORATION USING F-K FILTERING

BACKGROUND OF THE INVENTION

1. Field of the Invention

This invention relates to seismic exploration and more particularly, to a method for correctly restoring seismic traces using F-K filtering. This invention further relates to a method for restoring coherent events to missing traces in seismic data.

2. Description of the Prior Art

In seismic exploration, it is common practice to deploy a large array of geophones on the surface of the earth and to record the vibrations of the earth at each geophone location to obtain a collection of seismic traces. The traces are sampled and recorded for further processing. When the vibrations so recorded are caused by a seismic source activated at a known time and location, the recorded data can be processed by a computer in known ways to produce an image of the subsurface. The image thus produced is commonly interpreted by geophysicists to detect the possible presence of valuable hydrocarbons.

Seismograms are commonly recorded as digital samples representing the amplitude of a received seismic signal as a function of time. Since seismograms are usually obtained along a line of exploration on the surface of the earth, the digital samples can be formed into x-t arrays with each sample in the array representing the amplitude of the seismic signal as a function of horizontal distance and time. When such arrays are visually reproduced, by plotting or the like, seismic sections are produced. A seismic section depicts the subsurface layering of a section of the earth. It is the principal tool which the geophysicists studies to determine the nature of the earth's subsurface formations. Before an array of seismic samples or traces can be converted into a seismic section for interpretation by geophysicists, the array must be extensively processed to remove noise and to make reflection events discernible.

In the processing of seismograms, x-t arrays are sometimes transformed into arrays representing amplitude as a function of frequency and wave number. This is commonly referred to as a "frequency-wave number" or "f-k" transformation. The f-k transformation has been used as a tool to study seismic filtering. F-k transforms are routinely used to represent data collected by large arrays of sensors, including seismic data. Usually, the f-k representations are computed by Fast Fourier Transforms (hereafter referred to as FFTs). The resulting data representations are parameterized by frequencies, wave numbers (spatial frequencies), amplitudes, and phases. In particular, for each frequency there is a collection of wave numbers, and for each frequency-wave number pair there is a complex number representative of an amplitude and a phase. Among various applications of this representation are spectrum analysis (displaying the amplitude squared as a function of frequency and wave number) and filtering in the frequency-wave number domain.

In U.S. Pat. No. 4,218,765 issued to Kinkade, seismic traces are transformed to an f-k array and filtering is performed on the traces in the f-k domain. In U.S. Pat. No. 4,380,059 issued to Ruehle, multiple reflections are filtered from seismograms by transforming them into an f-k array representing amplitude as a function of frequency and wave number. In Ruehle, the f-k array of the seismograms is filtered by weighting all samples with the inverse of the f-k transform of the multiple reflections. In U.S. Pat. No. 4,594,693 issued to Pann et al, seismic trace interpolation is carried out by inserting zero amplitude traces between the seismic traces in a section where spatial aliasing is a problem. The traces are then transformed into an f-k array. The f-k array is filtered with a filter which rejects samples in a region of frequency and wave number which exhibits aliasing. The filtered f-k array is then transformed back into a seismic section representing amplitude as a function of time and distance.

A common problem during seismic data acquisition is the presence of seismic traces with no recorded data or seismic traces that clearly contain severe noise contamination. For example, the failure of one or more geophones intended to collect data can result in a seismic trace without data. Severe contamination, on the other hand, can result from numerous sources including random bursts of noise, multiple or intrabed reflections or ground roll.

Standard practice among geophysicists faced with seismic traces with no recorded data or severely contaminated seismic traces has been to exclude such traces, commonly referred to as "null" traces, from the otherwise satisfactory data set. The collected seismic data would be processed normally without the excluded data. When the missing trace was necessary for proper processing of the seismic data, prior attempts to restore the missing trace and create a trace with events consistent with nearby coherent events focused upon combining traces near the missing trace in the x-t domain to create the missing trace.

F-k spectrum analysis and filtering are particularly useful when seismic data are contaminated by large amplitude coherent noise which obscures geologically significant signals. Frequently, the coherent noise is concentrated in a different part of the f-k spectrum than the signals. In such cases, f-k filtering can potentially be used to attenuate the coherent noise and thus reveal the seismic signals for interpretation. However, the f-k filtering of seismic data to remove coherent noise does not produce satisfactory results when null traces interrupt large amplitude coherent events which are to be filtered out using an f-k filter discriminating primarily on dip. In these situations, significant processing noise is generated. This processing noise contaminates the filtered data trace corresponding to the previously missing trace and sometimes several adjacent traces. The processing noise thus generated potentially interferes with prestack interpretation and other processing.

SUMMARY OF THE INVENTION

It is the object of this invention to provide a method of using f-k filtering to restore coherent events to missing traces in seismic data such that the restored trace is consistent with coherent events in the vicinity of the restored trace.

It is another object of this invention to provide a method of restoring missing or null traces consistent with large coherent events in their vicinity such that processing noise generated during f-k filtering of the coherent events is reduced.

Still another object of this invention is to provide a method for the application of f-k filtering for the reduction of edge effects such as processing noise typically associated with the abrupt termination of data at the edge of seismic records.

A seismic record comprising a plural number of seismic traces and at least one null trace is transformed from the x-t (distance-time) domain to the f-k (frequency-wave number) domain by a series of fast Fourier transforms. The f-k transform of the seismic record is filtered to retain only coherent events and the filtered f-k transform is then inverse-transformed back to the x-t domain. A filtered x-t domain trace corresponding to the null trace is selected and substituted for the null trace in the seismic record. The filtered trace is then manipulated such that it becomes a close approximation of the missing trace. This may be achieved either by repeated iterations of the abovedescribed method or by a single iteration of the method followed by a mathematical determination of the converged trace.

The above and other objects, advantages and features of the invention will be more readily understood from the following detailed description of the invention, which is provided in connection with the accompanying drawings.

BRIEF DESCRIPTION OF THE DRAWINGS

FIG. 2 illustrates a x-t domain shot record of a series of seismic traces including a missing or null trace;

DESCRIPTION OF THE PREFERRED EMBODIMENT

1. Theory of the Invention

Figure 1A:
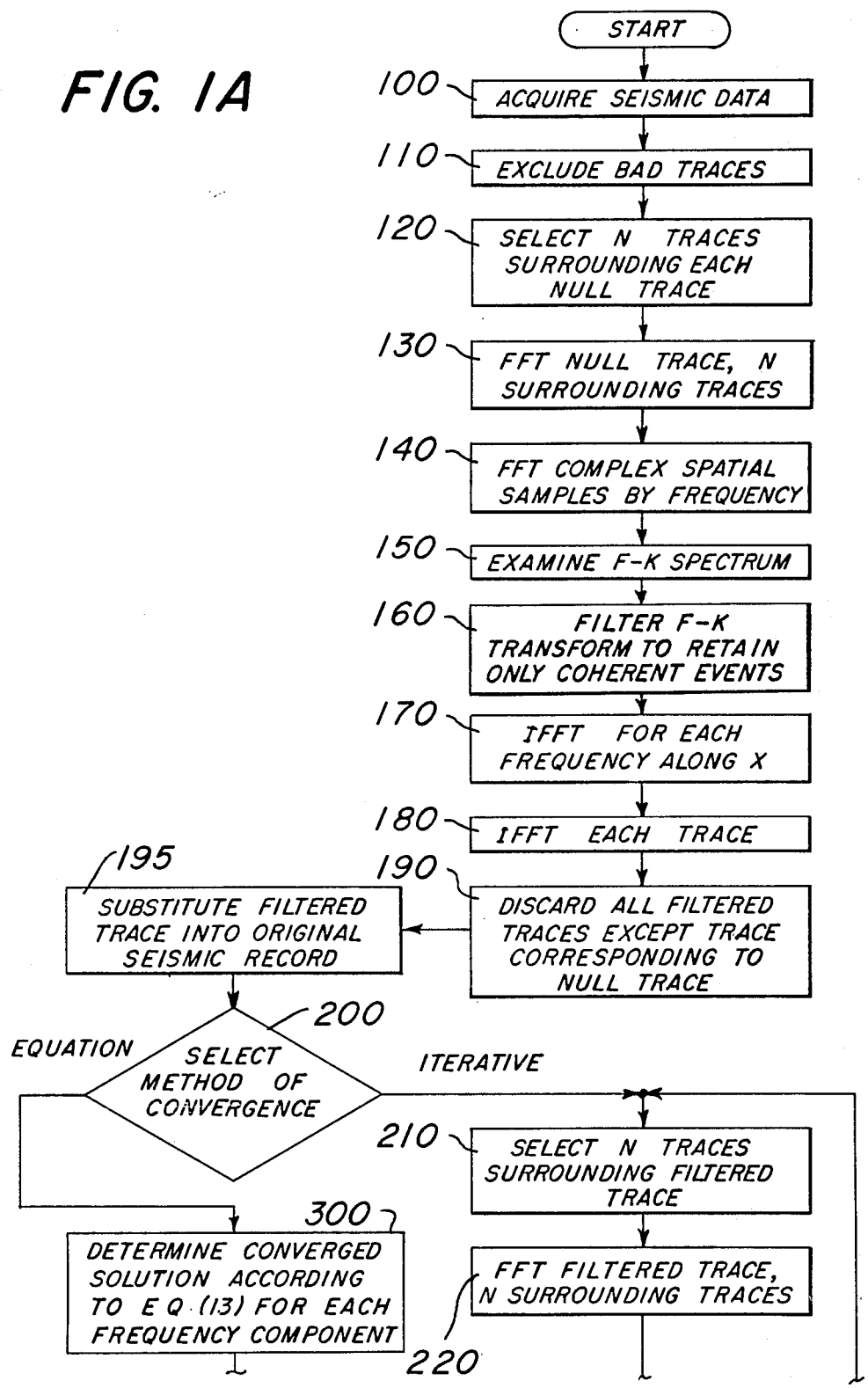
FIG. 1A and 1B illustrate, in flow chart form, the method of seismic trace restoration of the present invention.

Coherent events typically have a narrow velocity spectrum. For this reason, if the wave number spectrum corresponding to a single frequency of seismic data is examined, then coherent events which are approximately linear in the x-t domain will have a narrow band wave number spectrum. However, if a gap or abrupt interruption (i.e. a null trace) of a coherent event exists, then the wave number spectrum will contain a broad band energy associated with the gap.

Using the following model to represent a missing spatial sample $x(n)$ in a spatial sinusoidal sequence:

$$x(n) = \sin(2 * pi * k * dk * n * dx) \quad (1)$$

for:

$n = 0, 1, 2, \ldots, N-1$ $k = 0, 1, 2, \ldots, N-1$ where:

$pi = 3.14159;$ $k * dk =$ spatial frequency (wave number) of the sequence;

$dx =$ spatial sample interval; and $dk * dx = 1.0/N$

When no missing sample is present, the wave number spectrum consists of one component at wave number k. The sequence with a missing sample at location m can be represented as the sum of the uninterrupted signal plus a sequence consisting of zeros at every sample except for a value of $-x(m)$ at the location m corresponding to the location of the missing sample, or gap.

The discrete Fourier transform (hereafter abbreviated as "DFT") of a N-point sequence x may be represented as:

$$X(k) = \sum_{m=0}^{N-1} x(m) \, e^{(j2\pi km/N)} \quad (2)$$

for: $k = 0, 1, \ldots, N-1;$ where: the sum is over $m = 0, 1, 2, \ldots, N-1.$ The DFT of an ungapped sinusoidal spatial sequence is $[0, 0, \ldots, N, 0, 0, \ldots, 0]$ where the non-zero component occurs at location k, corresponding to the wave number of the sinusoidal sequence x. The DFT of the gapped sequence is the sum of the transform of the ungapped sequence plus the transform of the sequence $[0, 0, \ldots, -x(m), \ldots, 0]$. Because the transform of the second sequence is $$X(k) = -x(m) * e^{(j2\pi km/N)} \quad (3)$$

at all wave numbers, the transformed, gapped sequence is seen to have a broadband wave number spectrum. However, the broadband part of the spectrum corresponding to the presence of the gap has a smaller amplitude than the narrow band part of the spectrum corresponding to the coherent events of which restoration is sought.

Furthermore, if the gapped data were filtered so as to pass only the wave number component corresponding to the ungapped sequence, much of the effect of the gap would be removed. Consequently, a filtered, nongapped sequence would have a non-zero sample filling in the gap. For these reasons, a procedure to restore a missing sample in x-t data whose f-k spectrum is such that for each frequency the wave number spectrum is narrow band, is possible. The restored x-t data would be obtained by transforming the filtered f-k data back to the x-t domain. While a single application of the x-t to f-k transformation, f-k filtering, and f-k to x-t transformation will yield a filtered trace containing seismic data for substitution with the null trace of the original seismic record, repeat iterations of the above-described procedure where the filtered trace is substituted for the null trac will yield successive filtered traces, each being a more accurate estimation of the null trace being estimated as each iteration successively converges upon the desired trace.

In an alternate embodiment of the invention, the successive iterations necessary to converge upon the desired trace may be avoided and the first determination of the filtered trace used to calculate the converged solution for the desired trace. Recall that during the first determination of the filtered trace, the transform of the obtained seismic data (including the gap) into the f-k domain yielded:

$$X_0(k) = \text{SUM}[x(n) * e^{(j2\pi kn/N)}], \quad (4)$$

for $k = 0, 1, \ldots, N-1,$ where the sum is over $n = 0, 1, 2, \ldots, N-1$ and $x(m) = 0$ After inspecting the wave number amplitude spectrum ABS (absolute value) ($|X_0(k)|$) to identify the wave numbers corresponding to coherent events, the restored sample was obtained by filtering the data to retain only those coherent events previously identified. This was accomplished by an inverse DFT with non-coherent components zeroed out. Thus the restored sample $x_1(m)$ may be represented by:

$$x_1(m) = (1.0/N) * \text{SUM}[X_0(k) * e^{-j2\pi mk/N}] \quad (5)$$

where the sum is only over wave numbers associated with coherent events.

The second iteration of the method of the present invention would yield:

$$X_1(k) = \text{SUM}[x(n) * e^{(j2\pi nk/N)}] + x_1(m) * e^{(j2\pi mk/N)} \quad (6)$$

where the sum is over all samples, $n = 0, 1, \ldots, N-1$ except for $n = m$.

Therefore:

$$X_1(k) = X_0(k) + x_1(m) * e^{(2j\pi mk/N)}. \quad (7)$$

and:

$$x_2(m) = (1.0/N) * \text{SUM}[X_1(k) * e^{-(j2\pi mk/N)}] \quad (8)$$

where the sum is only over wave numbers associated with coherent events

Next, it may be determined that:

$$x_2(m) = x_1(m) + x_1(m) * (1.0/N) * \text{SUM}\,[1] \quad (9)$$

where the sum is only over wave numbers associated with coherent events.

Defining r as the following:

$$r = (1.0/N) * (\text{number of coherent event wave numbers}) \quad (10)$$

Then equation (9) provides that for two iterations:

$$x_2(m) = x_1(m) * [1.0 + r]. \quad (11)$$

Further, for M iterations, equation (11) would become:

$$x_M(m) = x_1(m) * [1.0 + r^2 + r^3 + \ldots + r^{(M-1)}]. \quad (12)$$

Providing that $r < 1$, which is true whenever fewer coherent events are restored than the number of spatial samples, the sequence converges, and the limit of the restored sample, $x_{\inf}(m)$ is given by the following equation:

$$x_{\inf}(m) = x_1(m) * [1.0/(1.0 - r)]. \quad (13)$$

By applying equation (13) to the first iterative determination $x_1(m)$ of the filtered restored sample, the restored sample value equivalent to an infinite number of iterations may be determined while requiring only a single iteration to obtain $x_1(m)$.

2. Method of the Invention

Figure 1B:
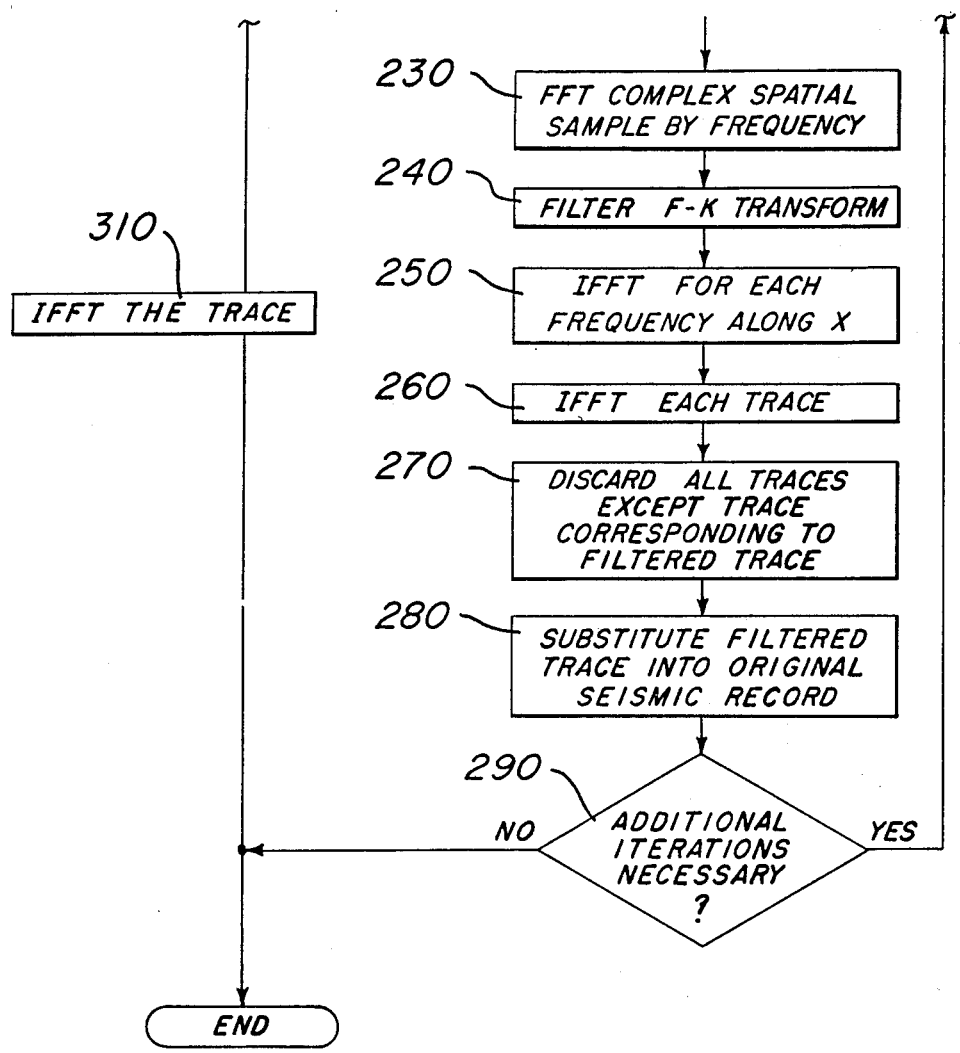

Turning first to FIG. 1, the method of restoring seismic traces using f-k transformations is hereby described. The method of the present invention commences at step 100 with the acquisition of seismic data using well know seismic exploration techniques. For example, an artificial disturbance may be generated along the earth by the use of dynamite or the like. The resulting acoustic waves travel downwardly in the earth and are reflected upward from subsurface reflecting interfaces. The reflected waves are received at geophones or other detectors located along the surface and recorded in reproducible form as seismograms. Seismic traces which would be acquired by a typical seismic survey may be seen by reference to FIG. 2. The seismic traces depicted in FIG. 2 represent the amplitude of seismic reflections as a function of time and distance along a line of exploration in the x direction of the earth's surface. These traces have been gathered into an x-t array commonly referred to as a "seismic section" or "seismic record".

Proceeding to step 110, any of the collected seismic traces which have either no recorded data or clearly contain severe contamination are excluded from the data set as "null" traces. For example, in FIG. 2, detail "A" is indicative of a null trace where no seismic data has been recorded. At step 120, N traces surrounding each missing trace are selected. The selection of N depends primarily on the coherency of events surrounding the null trace. While the number of traces N surrounding the missing or null trace will vary among recorded data sets, a selection of N=4 will provide satisfactory results for most seismic records.

Proceeding to step 130, each of the selected N traces (as well as the null trace) are fast Fourier transformed (or FFT'd) into the frequency domain. For each seismic trace x(t), the Fourier transform is defined as:

$$X(f) = \int h(t) e^{-j2\pi ft} dt \quad (14)$$

$$X(f) = R(f) + jI(f) = X(f)\, e^{j\theta(f)}$$

where:

R(f) is the real part of the Fourier transform;

I(f) is the imaginary part of the Fourier transform;

X(f) is the amplitude or Fourier spectrum of x(t) and is given by $R^2(f) + I^2(f)$; and $\theta(f)$ is the phase angle of the Fourier transform and is given by $\tan^{-1}[I(f)/R(f)]$.

The product of the first FFT of the seismic traces produces a series of complex values representative of amplitude and phase with respect to frequency.

Proceeding to step 140, each complex spatial sample, including the null (zero) sample, for each frequency is FFT'd a second time. For the FFT of the complex spatial sample, a first frequency is selected and all complex spatial samples for that frequency are FFT'd according to the following:

$$X_0(k) = \text{SUM}[x(n) * e^{(ej\pi kn/N)}], \text{ for } k = 0, 1, \ldots, N-1 \quad (15)$$

where:

the sum is over n=0, 1, 2, ..., N−1;

x(m)=0;

and $X_0(k)$ is the first iteration of the data.

Figure 3:
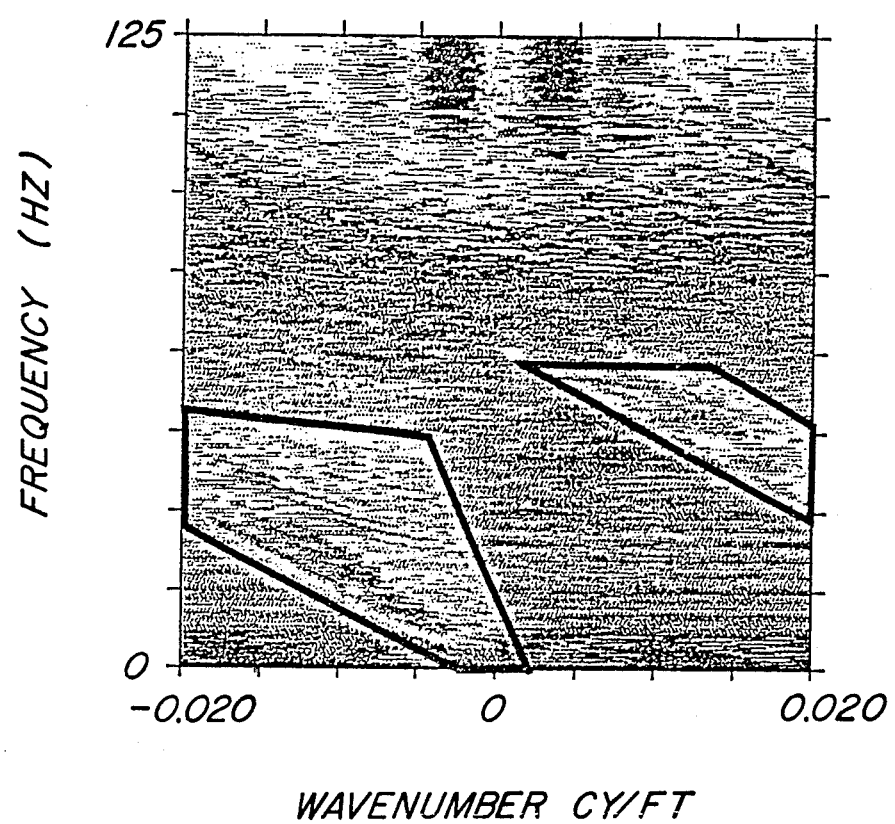
FIG. 3 illustrates the x-t domain shot record with a null trace of FIG. 1 transformed into the f-k domain.

The collection of FFT'd spatial samples comprises a two-dimensional array of complex values whose amplitude squared is an estimate of the f-k spectrum similar to the spectrum of FIG. 3.

At step 150, the f-k spectrum is examined to identify those areas containing primarily coherent events. A f-k filter is then designed at step 160 which will zero out all areas of the f-k transform except those which contain primarily coherent events. These steps of identifying coherent events in the f-k spectrum and designing a filter to preserve coherent events are well known in the art and need not be explained in further detail.

Figure 4:
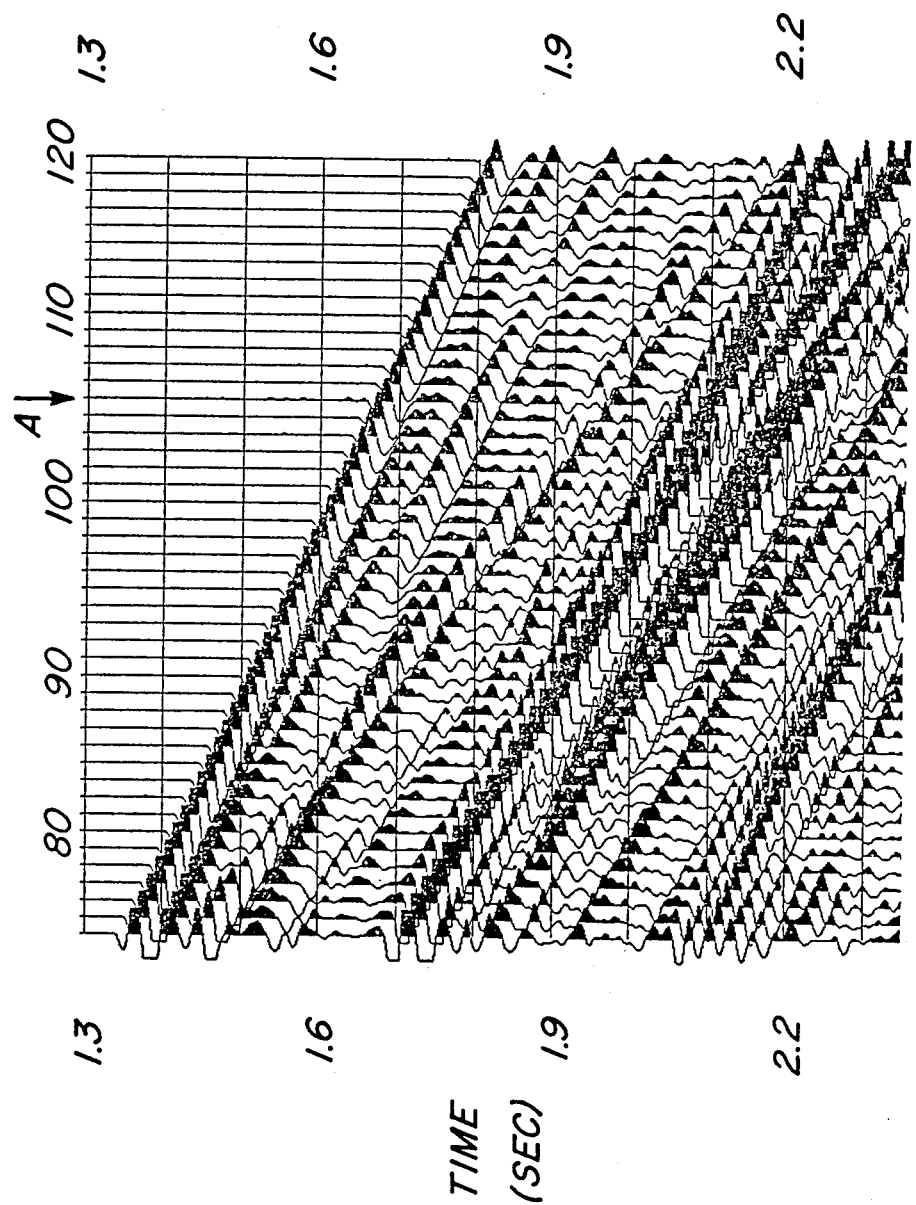
FIG. 4 illustrates the x-t domain shot record of FIG. 2 with the null trace restored according to the method of FIG. 1.

After filtering out all except coherent events in the f-k transform, the f-k transform is inverse FFT'd to the original x-t domain data (except for the null trace or traces which are no longer null). At step 170, the traces are IFFT'd for each frequency along x. Proceeding to step 180, the complex spatial samples produced at step 170 are IFFT'd a second time to produce the time domain x-t data. The filtered x-t data provided by step 180 will contain a non-zero trace in place of the previously null trace. For example, see FIG. 4 where detail "A" now shows a non-zero trace in place of the null trace. However, all of the other traces of the unfiltered data have also been replaced by new traces. As the non-null traces were considered good data, the effects of unnecessary filtering of the good or non-null traces is removed at step 190.

At step 190, all of the filtered x-t traces except the x-t traces which corresponds to the null traces are discarded. The remaining filtered x-t traces are substituted in the original seismic traces for the null traces. This completes the first iteration of the method for restoring seismic records of the present invention.

The method of the present invention proceeds at step 200 by selecting the method of converging the filtered trace to the best estimation of the original seismic trace. If the iterative method is selected at step 200, the same N traces which now surround the filtered data trace are selected at step 210. Each of the selected N traces (as well as the filtered data trace) are fast Fourier transformed (or FFT'd) into the frequency domain at step 220. Proceeding to step 230, the complex spatial samples, including those associated with the filtered data traces, for each frequency, are FFT'd a second time to produce a f-k transform.

Proceeding to step 240, the f-k transform is filtered using the previously designed f-k filter to again zero out those areas of the f-k transform which do not contain coherent events. After filtering out all but coherent events for the f-k transform, the f-k transform is transformed back to a time domain x-t representation by inverse Fast Fourier transforming the f-k (frequency-wave number) transform for each frequency along x at step 250, followed by a second inverse Fast Fourier transform at step 260 of the complex spatial samples produced by step 250 to produce x-t data at step 260. The filtered x-t data provided by step 260 will contain a new filtered data trace in place of the previous filtered data trace. At step 270, all of the new filtered x-t traces except the x-t trace which corresponds to the original filtered trace are discarded. The remaining new filtered x-t trace is substituted in the original seismic traces for the null trace at step 280. At step 290, the seismic record including the restored trace is examined and if the examination indicates that the restored trace is satisfactory (i.e. is sufficiently coherent with surrounding traces), the disclosed method of seismic trace restoration is completed. If further iterations of trace restoration are necessary, a return to step 220 for another iteration of the method of the present invention is performed.

Returning to step 220, if the determination of the convergence of the filtered trace to the best estimation of the original seismic trace by equation is desired, the method of the present invention proceeds to step 300 where the converged solution for each frequency component is determined according to the following equation:

$$x_{inf}(m) = x_1(m) * [1.0/(1.0-r)]. \tag{13}$$

where:

$$r = (1.0/N) * \text{(number of coherent event wave numbers)} \tag{10}$$

Proceeding to step 310, the trace produced by the application of equation (13) is inverse fast fourier transformed to produce the aforementioned best estimation of the original seismic trace.

The method of the present invention as described above provides further advantages in the interpretation of seismic data using f-k type analysis. As may be clearly seen by reference to FIG. 2, the recorded coherent events terminate abruptly at the edge of the seismic record. The abrupt termination of coherent events produces considerable processing noise when the seismic record is analyzed using the f-k methods described herein. This processing noise is generally referred to as "edge effects". The methods described herein, in addition to restoring samples corresponding to null traces, further provide the added benefit of reducing edge effects which occur during f-k filtering of seismic data.

In the embodiment of the invention described above, it is contemplated that after the f-k transform is filtered to remove events which are not coherent and to preserve coherent events, the entire f-k transform is transformed back to a time domain x-t representation by plural inverse Fourier transforms. Once the x-t domain data has been constructed, all of the traces of the constructed x-t domain data are discarded apart from the trace corresponding to the null traces. This procedure, while providing the desired result of restoring seismic data for null traces, requires an unnecessarily large amount of processing time. More specifically, the processing time required for a digital computer of typical design which performs the inverse FFT's of the f-k transform to construct the x-t data ma be greatly reduced by minor modification to the method of the invention.

After applying an f-k filter to preserve coherent events, the filtered f-k transform is inverse FFT'd to a complex spatial amplitude and frequency transform. The amplitude and phase data which does not correspond to the null trace being restored, is discarded. The remaining amplitude and phase information is inverse FFT'd to yield the restored null traces in the x-t domain. The restored traces corresponding to the null traces are then substituted for the null traces in the original seismic record.

Thus, there has been described and illustrated herein methods for restoring seismic traces using f-k filtering techniques. However those skilled in the art will recognize that many modifications and variations besides those specifically set forth may be made in the techniques described herein without departing substantially from the concept of the present invention. Accordingly, it should be clearly understood that the form of the invention described herein is exemplary only, and is not intended as a limitation on the scope of the claims.

What is claimed is:

1. In seismic exploration wherein seismic sources are activated at spaced locations along a line of exploration and the amplitude of reflections are recorded as a function of time along said line to produce a series of seismic traces, said series of seismic traces including at least one null trace, a method of restoring seismic data for said at least one null trace comprising the steps of:
   producing a frequency-wave number transform for said seismic traces and said null trace;
   filtering said frequency-wave number transform to retain only spatially coherent events;
   producing a distance-time representation for said filtered frequency-wave number transform;
   selecting a filtered trace of said produced distance-time representation which corresponds to said null trace; and
   substituting said selected filtered trace for said null trace to produce a restored seismic record.

2. The method according to claim 1 further comprising the steps of:
   examining said seismic traces to determine the temporal coherency of said seismic near said null trace; and
   selecting a plurality of seismic traces proximate to said null trace according to the temporal coherency of said seismic traces near said null trace.

3. The method according to claim 2 wherein the step of selecting a plurality of seismic traces proximate to said null trace according to said temporal coherency of said seismic traces near said null trace further comprises the steps of:
   selecting a value N based upon the temporal coherency of said seismic traces near said null trace; and
   selecting N traces immediately adjacent said null trace.

4. The method according to claim 1 wherein the step of producing a frequency-wave number transform for said selected seismic traces further comprises the steps of:
   transforming said series of seismic traces into a series of frequency domain complex representations; and
   transforming said frequency domain complex representations into said frequency-wave number transform.

5. The method according to claim 1 wherein the step of filtering said frequency-wave number transform to retain spatially coherent events further comprises the steps of:
   producing a frequency-wave number spectrum from said frequency-wave number transform;
   examining said frequency-wave number spectrum to identify spatially coherent events;
   designing a f-k filter based upon the spatial coherency of said frequency-wave number spectrum; and
   filtering said frequency-wave number transform to preserve only said spatially coherent events.

6. The method according to claim 1 wherein the step of producing a distance-time representation for said filtered frequency-wave number transform further comprises the steps of:
   transforming said filtered frequency-wave number transform into a series of frequency domain complex representation; and
   transforming said frequency domain complex representations into said filtered distance-time representation.

7. The method according to claim 1 further comprising the steps of:
   examining said restored seismic record; and
   repeating the steps of producing a frequency-wave number transform for said seismic traces and said null trace, filtering said frequency-wave number transform to retain only spatially coherent events, producing a distance-time representation for said filtered frequency-wave number transform, selecting a filtered trace of said produced distance-time representation which corresponds to said null trace, and substituting said filtered trace for said null trace to produce a restored seismic record.

8. The method according to claim 1 further comprising the steps of:
   producing a next frequency-wave number transform for said seismic traces and said selected filtered trace;
   filtered said next frequency-wave number transform to retain only spatially coherent events;
   producing a next distance-time representation for said next filtered frequency-wave number transform; and
   selecting a next filtered trace of said next produced distance-time representation which corresponds to said null trace; and
   substituting said next selected filtered trace for said null trace to produce a restored seismic record.

9. The method according to claim 5 further comprising the steps of:
   providing seismic data for said null trace according to the equation:

$X_{inf}(m) = x_1(m) * (1.0/(1.0-r))$.

where:

$r$ = $(1.0/N)$ * (number of coherent event wave numbers);
   $x_1(m)$ = a frequency component of said selected filtered trace;
   $X_{inf}$ = a fully restored frequency component corresponding to said frequency component; and
   $N$ = the number of immediately adjacent traces selected.

10. A method of restoring seismic data to a null trace included as part of a series of seismic traces or seismic record comprising the steps of:
    examining said seismic traces to determine the temporal coherency of said seismic traces near said null trace;
    selecting a value N based upon the temporal coherency of said seismic traces near said null trace;
    selecting N traces immediately adjacent said null trace;

producing a frequency-wave number transform for said selected seismic traces and said null trace;

filtering said frequency-wave number transform to retain only spatially coherent events;

producing a distance-time representation for said filtered frequency-wave number transform;

selecting a filtered trace of said produced distance-time representation which corresponds to said null trace; and substituting said filtered trace for said null trace to produce a restored seismic record.

11. The method according to claim 10 wherein the step of producing a frequency-wave number transform for said seismic traces further comprises the steps of:

transforming said series of seismic traces into a series of frequency domain complex representations; and transforming said frequency domain complex representations into said frequency-wave number transform.

12. The method according to claim 10 further comprising the steps of:

producing a frequency-wave number spectrum from said frequency-wave number transform;

examining said frequency-wave number spectrum to identify spatially coherent events;

designing a f-k filter based upon the spatial coherency of said frequency-wave number spectrum.

13. The method according to claim 10 wherein the steps of producing a distance-time representation for said filtered frequency-wave number transform further comprises the steps of:

transforming said filtered frequency-wave number transform into a series of frequency domain complex representations; an transforming said frequency domain complex representations into said filtered distance-time representation.

14. The method according to claim 10 further comprising the steps of:

examining said restored seismic record; and repeating the steps of producing a next frequency-wave number transform for said selected seismic traces and said selected filtered trace, filtering said next frequency-wave number transform to retain only spatially coherent events, producing a distance-time representation for said next filtered frequency-wave number transform, selecting a next filtered trace of said produced distance-time representation which corresponds to said null trace and substituting said next selected filtered trace for said selected filtered trace to produce a next restored seismic record.

15. The method according to claim 10 further comprising the steps of:

providing seismic data for said null trace according to the equation:

$$x_{inf}(m) = x_1(m) * (1.0/(1.0-r)).$$

where:

$r$ = $(1.0/N)$ * (number of coherent event wave numbers);

$x_1(m)$ = a frequency component of said selected filtered trace;

$x_{inf}$ = a fully restored frequency component corresponding to said frequency component; and $N$ = the number of immediately adjacent traces selected.

16. In seismic exploration wherein seismic sources are activated at spaced locations along a line of exploration and the amplitude of reflections are recorded as a function of time along said line to produce a series of seismic traces, said series of seismic traces including at least one null trace, a method of restoring seismic data for said at least one null trace comprising the steps of:

producing a frequency-wave number transform for said seismic traces and said null trace;

filtering said frequency-wave number transform to retain only spatially coherent events;

producing amplitude and phase information for said seismic traces from said filtered transform;

selecting said amplitude and phase information related to said null trace;

producing a filtered trace from said selected amplitude and phase information; and substituting said filtered trace for said null trace to produce a restored seismic record.

17. The method according to claim 16 further comprising the steps of:

examining said seismic traces to determine the temporal coherency of said seismic traces near said null trace; and selecting a plurality of seismic traces proximate to said null trace according to the temporal coherency of said seismic traces near said null trace.

18. The method according to claim 17 wherein the step of selecting a plurality of seismic traces proximate to said null trace according to said temporal coherency of said seismic traces near said null trace further comprises the steps of:

selecting a value N based upon the temporal coherency of said seismic traces near said null trace; and selecting N traces immediately adjacent said null trace.

19. The method according to claim 16 wherein the step of producing a frequency-wave number transform for said selected seismic traces further comprises the steps of:

transforming said series of seismic traces into a series of frequency domain complex representations; and transforming said frequency domain complex representations into said frequency-wave number transform.

20. The method according to claim 16 wherein the step of filtering said frequency-wave number transform to retain only spatially coherent events further comprises the steps of:

examining said frequency-wave number spectrum to identify spatially coherent events;

resigning a f-k filter based upon the spatial coherency of said frequency-wave number spectrum.

21. The method according to claim 16 further comprising the steps of:

examining said restored seismic record; and repeating the steps of producing a frequency-wave number transform for said seismic traces and said null trace, filtering said frequency-wave number transform to retain only spatially coherent events, producing amplitude and phase information for said seismic traces from said filtered transform, selecting said amplitude and phase information related to said null trace, producing a filtered trace from said selected amplitude and phase information and substituting said filtered trace for said null trace to produce a next restored seismic record.

22. The method according to claim 16 further comprising the steps of:

providing seismic data for said null trace according to the equation:

$$x_{inf}(m) = x_1(m) * (1.0/(1.0-r)).$$

where:

$r$ = $(1.0/N)$ * (number of coherent event wave numbers);

$x_1(m)$ = a frequency component of said selected filtered trace;

$x_{inf}$ = a fully restored frequency component corresponding to said frequency component; and $N$ = the number of immediately adjacent traces selected.

* * * * *